United States Patent [19]

Diepers et al.

[11] Patent Number: 4,740,855
[45] Date of Patent: Apr. 26, 1988

[54] MAGNETIC THIN-FILM HEAD HAVING A MAIN AND AN AUXILIARY POLE FOR VERTICAL MAGNETIZATION

[75] Inventors: Heinrich Diepers, Höchstadt; Herbert Schewe, Herzogenaurach, both of Fed. Rep. of Germany

[73] Assignee: Siemens Aktiengesellschaft, Munich, Fed. Rep. of Germany

[21] Appl. No.: 913,016

[22] Filed: Sep. 29, 1986

[30] Foreign Application Priority Data

Oct. 18, 1985 [DE] Fed. Rep. of Germany ....... 3537181

[51] Int. Cl.[4] ............................................. G11B 5/47
[52] U.S. Cl. .................................... 360/126; 360/119
[58] Field of Search ...................... 360/126, 123, 119

[56] References Cited

U.S. PATENT DOCUMENTS 4,404,609 9/1983 Jones ................................... 360/126
4,546,398 10/1985 Toda ................................... 360/126

FOREIGN PATENT DOCUMENTS 0012912 12/1979 European Pat. Off. .
0012910 7/1980 European Pat. Off. .
0146003 6/1985 European Pat. Off. .
55-42352 6/1980 Japan .
57-183618 2/1983 Japan .
58-150121 12/1983 Japan .

OTHER PUBLICATIONS

IBM TDB, vol. 26, #1, 6-1983, pp. 354-356; A. Vinal; Single-Track Mag. Read/Write Head Str.
IEEE Trans. Magn., vol. Mag-16, No. 1, Jan. 1980, pp. 71-76.
Feinwerktechnik & Messtechnik, Mar. 1980, pp. 53-59, Siemens Zeitschrift 52 (1978), pp. 434-437.

Primary Examiner—A. J. Heinz
Attorney, Agent, or Firm—Kenyon & Kenyon

[57] ABSTRACT

A magnetic thin-film head with layer-wise buildup on a nonmagnetic substrate is provided for a recording medium which can be magnetized perpendicularly (vertically), and contains a conduction body which carries the magnetic flux, and the magnet legs of which form a main and an auxiliary pole. With these magnet legs which are arranged on the substrate with predetermined spacing side by side, a write/read coil winding is associated, the conductor turns of which extend through a space formed between the magnet legs. This magnetic head should be able to fly at a very small flying altitude above the recording and should at the same time be easy to realize in a thin film technique. To this end, it is provided that only the partially overlapping magnet legs serve as the magnetic conduction body, which are connected together in their common overlap zone, forming a magnetic return in a partial region and are spaced outside of this return region, forming the intermediate space for the conductors.

12 Claims, 5 Drawing Sheets

MAGNETIC THIN-FILM HEAD HAVING A MAIN AND AN AUXILIARY POLE FOR VERTICAL MAGNETIZATION

BACKGROUND OF THE INVENTION

The present invention relates to a magnetic thin-film head of layer-wise construction on a nonmagnetic substrate for a recording medium which contains a magnetizable storage layer, into which information can be written along a track by perpendicular (vertical) magnetization. This magnetic head comprises a magnetic conduction body which carries the magnetic flux and of which the end pieces of its magnetic legs, facing the recording medium and which form a main and an auxiliary pole are arranged side by side with predetermined spacing on one flat side of the substrate, the normal of which is oriented at least approximately parallel to the longitudinal direction of the track, and is provided with at least one write/read coil winding, the conducting turns of which extend through a space formed between the magnetic legs.

Such a magnetic head is known, for instance, from European Patent Application No. 0,146,003 A1.

The principle of vertical magnetization for storing information is generally known (see, for instance, "IEEE Transactions on Magnetics", Vol. MAG-16 No. 1, January 1980, pages 71 to 76, or the mentioned European Patent Application).

For this principle, which is frequently also called vertical magnetization, special write/read magnetic heads are required. A head suitable therefor comprises generally, for conducting the magnetic flux, a conducting body {applied to a flat, non-magnetic substrate} of magnetizable material of, in particular, ring-head-like shape which is {−}. Such a magnetic conduction body can comprise, for instance, two magnet legs which are facing the recording medium, wherein one of these forms a main pole, by which a sufficiently strong vertical magnetic field for reversing the magnetization of the storage layer can be generated. The necessary magnetic return can then be accomplished by means of another magnet leg which forms, in particular, a so-called auxiliary pole.

In magnetic heads of this head type, the auxiliary pole is to serve only as the magnetic flux return. Possible cross writing of this auxiliary pole may even by tolerated since the writing main pole can be arranged so that it later overwrites information which may have been written by the auxiliary pole. However, to prevent concurrent reading of the auxiliary pole with its trailing edge at least to a large extent, the spacing formed between the two poles would have to be relatively large so as to assure a far-reaching reduction of the magnetic flux density at the auxiliary pole. In magnetic heads with magnetic poles which are arranged one behind the other as seen in the direction of motion of the head, a gap layer filling this spacing is extremely difficult to make, particularly in thin-film technology.

For this reason, the two poles of the magnet leg shown in the European Patent Application mentioned at the outset, are not arranged in the direction of motion one behind the other, but side by side. Therefore the two magnet legs as well as the turns of at least one write/read coil winding can be applied relatively simply to the non-magnetic substrate body by a thin-film technique. Such techniques are generally known (see for instance, "Feinwerktechnik und Messtechnik", Vol. 88, No. 2, March 1980, pages 53 to 59, or "Siemens-Zeitschrift", Vol. 52, No. 7, 1978, pages 434 to 437). Here, the two poles can also be arranged relatively far from each other, so that optionally, even the formation of separate gap layers between the poles can be dispensed with.

The magnetic conduction body of the magnetic head known from the European Patent Application comprises, besides the two magnetic legs oriented substantially perpendicularly to the recording medium with the main and the auxiliary pole, a further connecting leg extending transversely thereto. This connecting leg which serves as the magnetic return between the two magnet legs should comprise a magnetic material, the easy magnetization of which is aligned substantially perpendicularly with the easy magnetization in the magnet legs. The formation of a corresponding magnetic conduction body, however, is relatively expensive.

In addition, the conductor turns of the write/read coil winding are to extend outside of the relatively extensive auxiliary pole only around the connection zone which is formed between the connecting leg and the magnet leg of the main pole. Such an arrangement, however, requires a corresponding width of the magnetic conduction body and the flat side containing the coil widing of a substrate. The substrate is part of a so-called aerodynamic body (flying body), on the underside of which, facing the recording medium, at least one flying runner is formed. The end face of this flying runner then represents the flat side available for receiving the magnetic head. If now, in a solid disc memory, the flight altitude of the magnetic body above the recording medium is to be kept extremely small and is to be, in particular, less than 0.3 μm, the width of the flying runner is limited to a few 100 μm, for instance, to less than 600 μm, for aerodynamic reasons (see also FIG. 1). Then, however, a design according to the magnetic head known from the European Patent Application can be realized only with difficulty on a flat side of such small width.

SUMMARY OF THE INVENTION

It is therefore an object of the present invention to improve the magnetic thin-film head of the type mentioned at the outset such that it can be realized for a solid disc memory with a flying altitude of the mentioned order of magnitude by a thin-film technique in a relatively simple manner.

The above and other objects of the present invention are achieved by the provision of partially overlapping magnet legs as the magnetic conduction body which in their common overlap zone, are connected together in a partial region, forming a magnetic return region, and outside of this return region are spaced, forming the space between which the conductors of the windings are disposed.

The advantages connected with this design of the magnetic head, are in particular that now, also a part of the region occupied by the relatively extensive magnet leg with the auxiliary pole is available for the arrangement of the conductor turns of the coil winding. Therefore, a relatively compact design can be assured with a nevertheless relatively large spacing between the main and the auxiliary pole. In addition, a separate connecting leg between the two magnet legs of the main and auxiliary pole with a special correction of magnetization is not required. The magnetic head according to the invention can therefore be fabricated in thin-film technology relatively simply.

BRIEF DESCRIPTION OF THE DRAWINGS

For explaining the invention in greater detail, reference is made to the drawings, in which.

In the figures, like parts are provided with like reference symbols.

DETAILED DESCRIPTION

Figure 1:
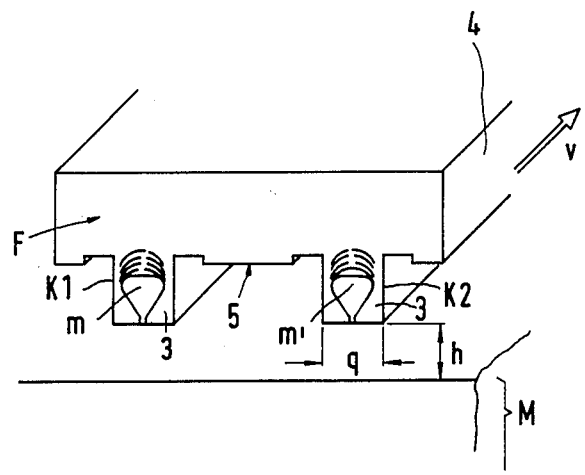
FIG. 1 shows an arrangement of a known magnetic head on a known flying body.

In FIG. 1, the flat side F of a fragment of the substrate 4 can be seen schematically in an oblique view. This flat side forms the end face or, in particular, the back side of a commonly used element, also called the flying body. Two magnetic heads m and m' are arranged on the flat side F. These heads, not detailed in the figure, are known per se (see, for instance, European Patent Application Nos. 0,012,910 A1, or 0,012,912 A1). One of the magnetic heads, for instance, the head m, serves for the vertical magnetization of an appropriate recording medium M; it must be guided at only a small flight altitude h above this medium. The other magnetic head m' is provided only for manufacturing reasons and has no function. The direction of motion of the recording medium M relative to the magnetic head m is indicated by an arrow v. In order to ensure a flight altitude h of, for instance, about 0.2 $\mu$m, the underside 5 of the substrate 4 facing the recording medium M is structured for aerodynamic reasons in such a manner that at least two flight runners K1 and K2 are developed, each with rectangular cross section. On the sub-areas 3 of the flat side F occupied by these runners, the two magnetic heads m and m' are applied. Since the transverse dimension q of the areas 3 is limited to a few 100 $\mu$m, the difficulties mentioned arise if one wants to arrange there the magnetic heads known from European Patent Application No. 0,146,003 A1. These difficulties do not arise, at least to a large extent, with the magnetic head according to the invention shown in FIG. 2.

Figure 2:
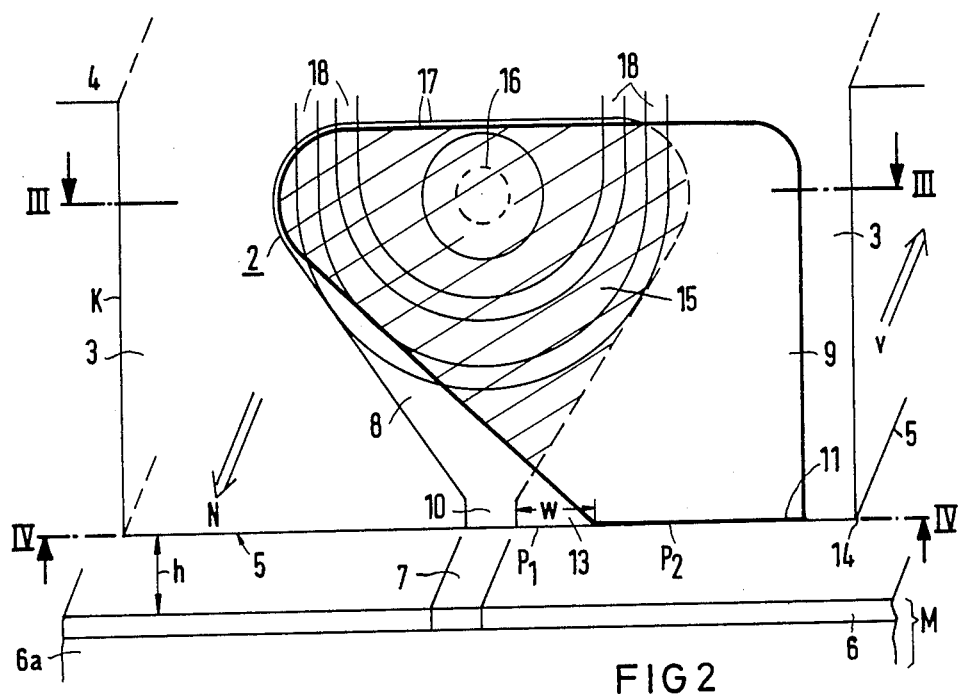
FIG. 2 shows a magnetic head according to the invention in a top view, of which cross sections are shown in FIGS. 3 and 4.

With the magnetic head according to the invention, schematically shown in FIG. 2, it should be possible to execute a write as well as a read function according to the principle of vertical magnetization. This head, shown as a top view, which is generally designated with 2, is located on the flat side 3 of the substrate 4 shown in FIG. 1 in the vicinity of one of the flight runners K. With the magnetic head 2 a storage layer 6 of a recording medium M can be magnetized vertically along a track 7. This storage layer consists, for instance, of a CoCr alloy with vertical orientation and is generally located on a magnetically soft substrate 6a, for instance, of an NiFe, CoZr or CoHf alloy.

The magnetic head 2 comprises two magnet legs 8 and 9 which are aligned at their ends 10 and 11 facing the recording medium M, at least approximately perpendicularly to the surface of the recording medium and form there a magnetic main pole $P_1$ and a broader magnetic auxiliary pole $P_2$, respectively. The magnetic layers of the legs exhibit here an uniaxial magnetic anisotropy, the preferred axes of magnetization being oriented parallel to the storage layer 6 and perpendicularly to the direction of motion v. An air gap 13 with a predetermined and advantageously relatively large width w is formed between the two leg ends 10 and 11. The magnet poles $P_1$ and $P_2$ are therefore arranged side by side as seen in the direction of motion v; i.e., the flat substrate side 3 supporting it with the edge of the flying body edge 14 formed between it and the under side 5 of the substrate is to be aligned and conducted in such a manner that the normal N lies on the flat side 3 parallel to the direction of motion v or to the longitudinal direction of the track 7 in a plane parallel to the surface of the recording medium M.

According to the embodiment shown, the entire magnet leg 8 forming the main pole $P_1$, and the magnet leg 9 with its end 11 forming the auxiliary pole $P_2$ lie directly on the substrate surface 3. According to the invention, the magnet leg 9 is furthermore designed in such a way that it overlaps the magnet leg 8 on its side facing away from the auxiliary pole $P_2$. The overlap zone designated with 15 is indicated in the figure by shading. In this zone 15, the magnet leg 9 is connected directly to the magnet leg 8 only in a partial zone 16, so that there, a magnetic return R between these two legs exists and thereby, a magnetic conduction body 17 with an approximately ring head-like shape is obtained. Outside the return area 16, on the other hand, the two magnet legs 8 and 9 are spaced so far apart that the conductor turns 18 of a write/read coil winding can extend through the space formed thereby between these two layers. In the figure, only two of these turns are indicated for the sake of clarity, which surround the magnetic return area 16 in the shape of a semicircle.

Figure 3:
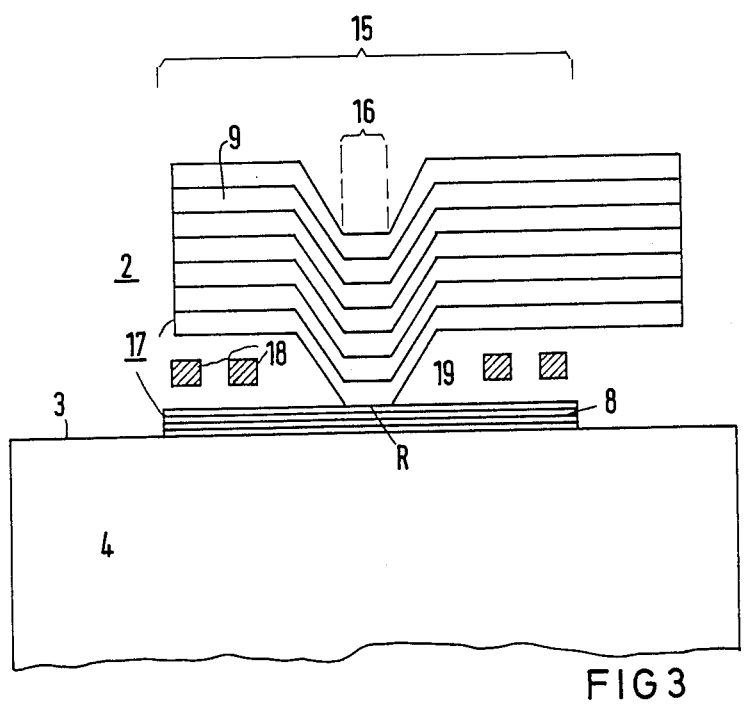

This design of a magnetic head according to the invention and FIG. 2 can be seen particularly also from the cross section which is taken along the sectional line designated in the figure with III—III and through the magnetic return area 16, and is shown in FIG. 3. From this figure can be seen particularly the design of the magnetic return area 16 as well as of the space containing the conductor turns 18 of the coil winding and designated with 19, between the magnet legs 8 and 9. In addition, the layer-wise construction of the magnetic head 2 is illustrated which can be realized in the side-by-side arrangement of the two magnet poles $P_1$ and $P_2$ relatively simply by a thin-film technique using known methods (see, for instance, the European Patent Application mentioned at the outset). The magnetic layers which form the main and auxiliary pole, are preferably laminated and may comprise special NiFe alloys (for instance, of "Permalloy"-Registered Trade Mark of Western Electric Company) or of amorphous materials such as CoZr or CoHf.

Figure 4:
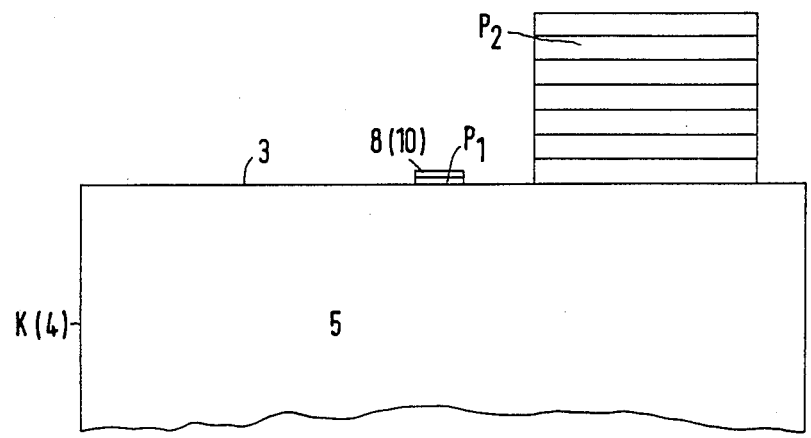

FIG. 4 shows schematically a further section through the magnetic head 2 shown in FIG. 2. This section is taken along a line designated with IV—IV in FIG. 2. In the sectional plane there are the ends of the two magnet poles $P_1$ and $P_2$ facing the recording medium as well as the underside 5 of the substrate 4 formed into a flight runner K. As can clearly be seen from this figure, the visible area of the auxiliary pole $P_2$ is substantially larger, and preferably at least 10 times larger than that of the main pole $P_1$.

Figure 5:
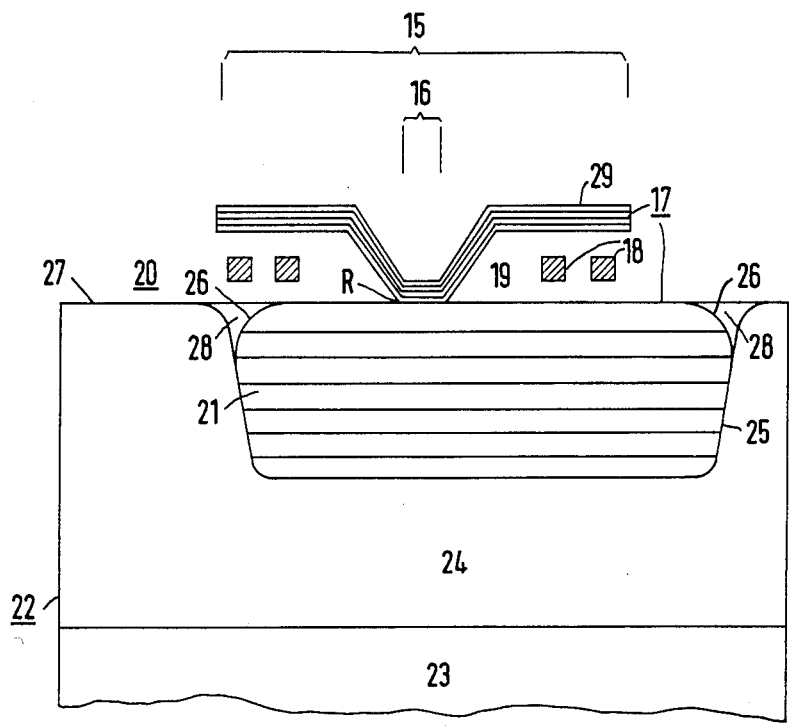
FIGS. 5 and 6 illustrate a second embodiment of a magnetic head according to the invention in cross sections.

According to the embodiment of the magnetic head 2 shown schematically in FIGS. 2 to 4, it was assumed that the layer-wise buildup of the head is to be made on a plane, flat side 3 of the substrate 4. However, as indicated in FIG. 5, on of the two magnet legs can be made sunk in the substrate at least in the vicinity of its end forming the respective magnet pole. From this figure can be seen schematically a section through a magnetic head 20, where the section corresponding to the cross section III—III of FIG. 3 is taken through the magnetic return area 16 of both its magnet legs. In the case of the magnetic head 20, its magnet leg 21, forming the auxiliary pole, is arranged sunk in the substrate 22. It is assumed here that the substrate body 23 proper consists of an electrically conductive material such as TiC enriched with $Al_2O_3$ and that therefore an insulating layer 24, for instance, of $Al_2O_3$ is required. The magnet leg 21 is therefore placed in a corresponding depression 25 of this layer 24. The depression can be made, for instance, by etching, for instance, ion beam etching or by sawing or by a combination of different techniques known per se. It is of advantage in any case if the edges 26 of this magnet leg are rounded in the vicinity of the pole end and preferably also in other areas. Such rounding is obtained particularly by ion beam etching. If the magnetic layers of the leg 21 are structured in this manner, there are obtained between this leg and the substrate surface or flat side 27 gusset-like ditches 28 which are leveled, if desired, in a manner known per se. Onto the surface leveled in this manner, the individual conductor turns 18 of the write/read coil winding are first applied according to the fabrication of the magnetic head 2, where an area 16 is left free or exposed for the magnetic return R provided. Subsequently, the layers of the magnet leg 29 forming the main pole are deposited which, in the return area 16, rest directly against the magnet leg 21 forming the auxiliary pole.

Figure 6:
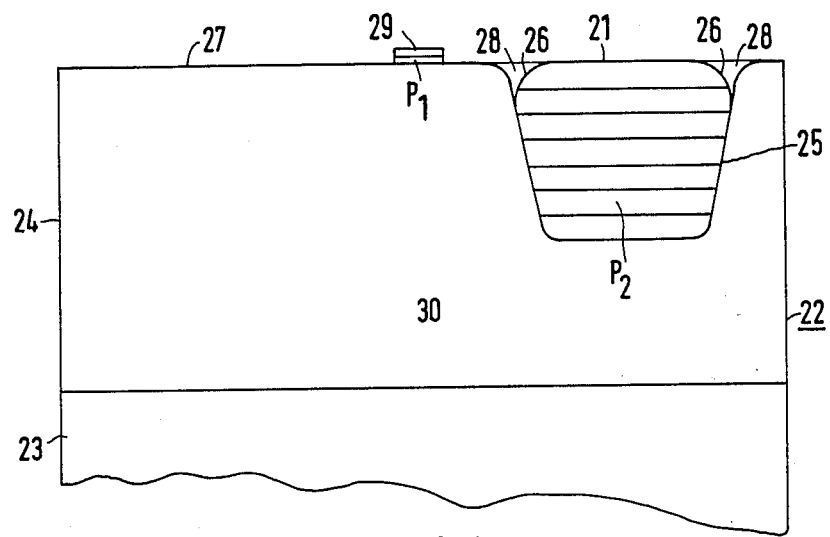

A further section through the substrate 22 supporting the magnetic head 20 can be seen from FIG. 6, the section being taken in accordance with FIG. 4. This figure shows schematically the pole areas of the main and the sunk auxiliary pole $P_1$ and $P_2$ respectively, of different sizes at the underside 30 of the substrate 22 in the shape of a flying runner. In addition, it can clearly be seen that in the auxiliary pole $P_2$, sharp corners 26 are largely avoided so that the magnetic field can leave the auxiliary pole without disturbing field increases. The flat substrate side 27 is leveled here by means of fillings of the trenches 28, for instance, both $Al_2O_3$.

Figure 7:
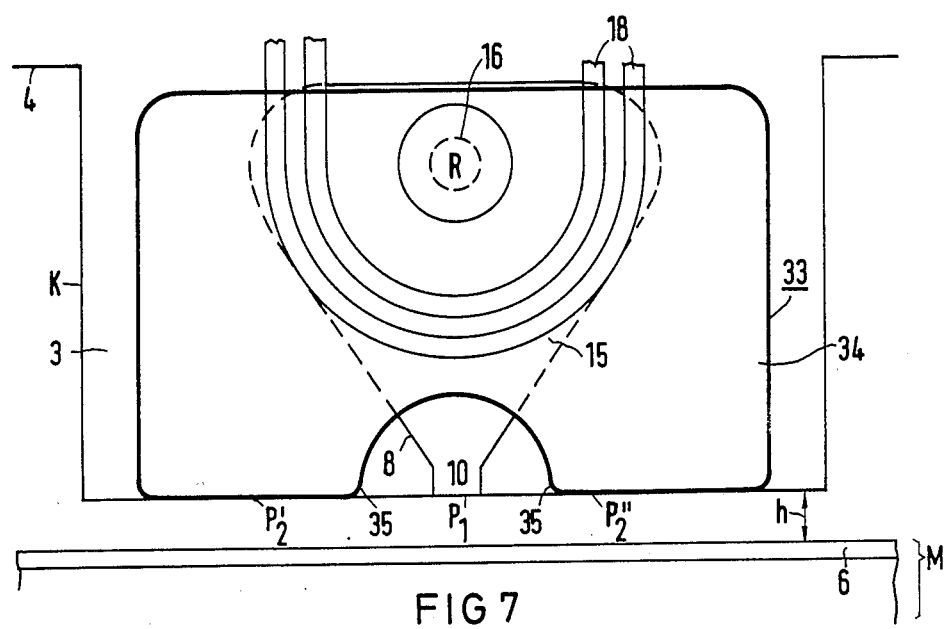
FIGS. 7 and 8 show a further embodiment of a magnetic head according to the invention in a top view and an oblique view, respectively.

From FIG. 7, a further magnetic head 33 can be seen in a view corresponding to FIG. 2. This magnetic head differs from the head 2 according to FIG. 2 essentially by the fact that, with its outer magnet leg 34, two auxiliary poles $P'_2$ and $P''_2$ are formed, where this leg is preferably arranged at least largely symmetrically to the magnet leg 8 which forms the main pole $P_1$ and is partially overlapped by it. Thereby, the magnetic field amplitudes at the auxiliary poles are approximately halved, so that improved magnetic flux conduction and an accordingly smaller magnetic resistance are obtained. The auxiliary pole $P'_2$ and $P''_2$ advantageously have rounded edges 35.

Also this magnetic head 33 can, of course, be designed in accordance with the embodiments of FIGS. 5 and 6, where one of its magnet legs, preferably the leg 34 forming the auxiliary poles, is sunk into the substrate 4 or 22, respectively.

Figure 8:
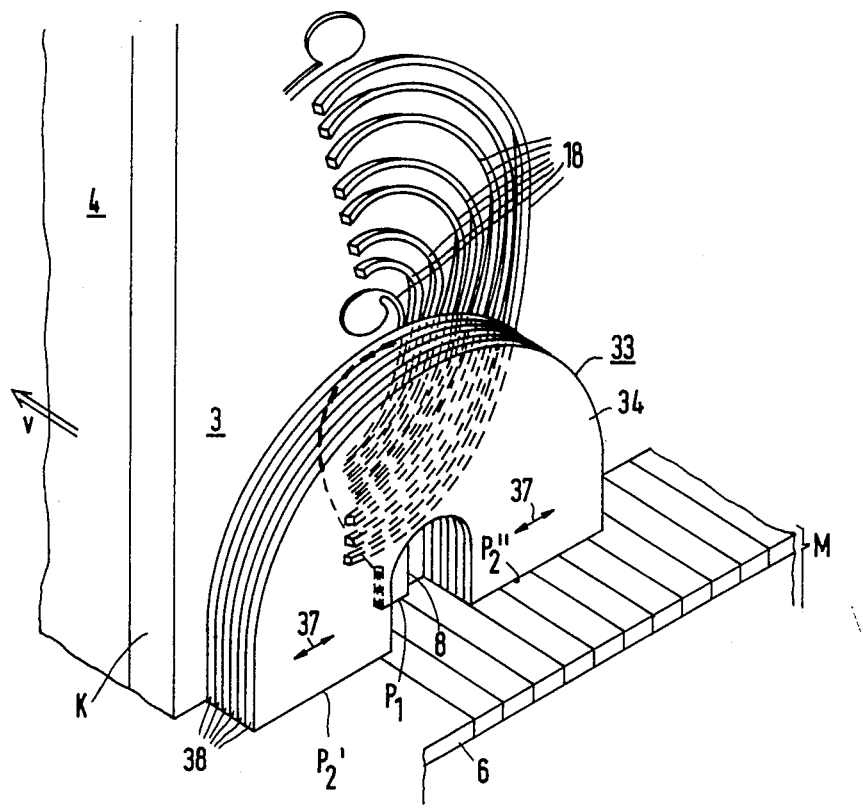

FIG. 8 shows schematically a magnetic head 33 shown in FIG. 7, in an oblique view. As indicated in this FIG. 8 additionally by arrows 37, the magnet legs of all magnetic heads according to the invention, forming a main pole and the one or more auxiliary poles are built up from magnetic legs, of which the preferred axes of magnetization (into the easy direction) are oriented parallel to the surface of the storage layer 6 of the recording medium M and perpendicularly to the relative motion v. In this figure, the magnetic layers of the corresponding magnet leg 34, forming the two auxiliary poles $P'_2$ and $P''_2$ are designed with 38.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A magnetic thin-film head comprising a layer wise buildup on a nonmagnetic substrate for a recording medium having a magnetizable storage layer into which information can be written along a track by perpendicular magnetization, which magnetic head comprises a magnetic conduction body which carries magnetic flux having two magnet legs each with an end piece, each of said end pieces facing the recording medium, one end piece forming a main pole and the other end piece forming at least one auxiliary pole, said end pieces being arranged with a predetermined space therebetween parallel to a flat side of the substrate, said flat side having a normal which is oriented at least approximately parallel to the longitudinal direction of the track, and including at least one write/read coil winding having conductor turns extending through a space formed between the magnet legs, the magnet legs partially overlapping each other in a common overlap zone, said magnet legs being connected together in a region of said common overlap zone forming a magnetic return region and being spaced outside of the return region to form an intermediate space for the conductor turns of the coil winding.

2. The magnetic head recited in claim 1, wherein the substrate is provided with a depression in which at least one end piece of one magnet leg forming a magnet pole is arranged.

3. The magnetic head recited in claim 2, wherein at least the end piece of one magnet leg forming the auxiliary pole is arranged in the depression of the substrate.

4. The magnetic head recited in claim 2, wherein the substrate contains an insulating layer which is provided with the depression.

5. The magnetic head recited in claim 4, wherein the substrate contains a body of $TiC$—$Al_2O_3$ to which the insulating layer comprising $Al_2O_3$ is applied.

6. The magnetic head recited in claim 2, wherein a free side of the magnet leg arranged in the depression together with an adjoining flat side of the substrate, forms an at least largely planar surface on which the conductor turns of the write/read coil winding and a part of the further magnet leg forming the magnetic return are arranged.

7. The magnetic head recited in claim 1, wherein the edges of at least the auxiliary pole of the corresponding magnet leg are rounded.

8. The magnetic head recited in claim 1, wherein the surface facing the recording medium of the auxiliary pole is at least 10-times larger than the corresponding area of the main pole.

9. The magnetic head recited in claim 1, wherein the conductor turns of the write/read coil winding surround at least partially the magnetic return region.

10. The magnetic head recited in claim 1, wherein the further magnet leg forming the auxiliary pole comprises two auxiliary poles which are located on both sides of the main pole.

11. The magnetic head recited in claim 10, wherein the two auxiliary poles are arranged at least largely symmetrically to the main pole.

12. The magnetic head recited in claim 1, wherein the magnetic layers of the magnet leg forming the main pole and of the magnet leg forming the at least one auxiliary pole have a uniaxial anisotropy, whereby preferred axes of magnetization are oriented at least approximately parallel to the storage layer of the recording medium and perpendicularly to the relative direction of motion.

* * * * *